United States Patent
Tagliabue

(10) Patent No.: US 8,608,898 B2
(45) Date of Patent: Dec. 17, 2013

(54) MULTILAMINAR WOOD VENEER BLOCK, MULTILAMINAR WOOD VENEERS AND METHOD FOR THE MANUFACTURE THEREOF

(75) Inventor: Andrea Tagliabue, Cantú (IT)

(73) Assignee: Tabu S.p.A, Cantu' (IT)

( * ) Notice: Subject to any disclaimer, the term of this patent is extended or adjusted under 35 U.S.C. 154(b) by 205 days.

(21) Appl. No.: 12/999,874

(22) PCT Filed: Jul. 16, 2009

(86) PCT No.: PCT/IB2009/006256
§ 371 (c)(1),
(2), (4) Date: Dec. 17, 2010

(87) PCT Pub. No.: WO2010/007510
PCT Pub. Date: Jan. 21, 2010

(65) Prior Publication Data
US 2011/0097565 A1   Apr. 28, 2011

(30) Foreign Application Priority Data
Jul. 18, 2008  (IT) .............................. MI2008A1307

(51) Int. Cl.
*B29C 65/00* (2006.01)
*B31B 1/60* (2006.01)
*B32B 37/00* (2006.01)
*B32B 38/04* (2006.01)
*B32B 7/02* (2006.01)
*C04B 37/00* (2006.01)

(52) U.S. Cl.
USPC ............. 156/325; 156/60; 156/182; 156/250; 428/215

(58) Field of Classification Search
USPC ...................... 156/60, 182, 250, 325; 428/215
See application file for complete search history.

(56) References Cited

U.S. PATENT DOCUMENTS

| | | | |
|---|---|---|---|
| 4,731,145 A * | 3/1988 | Senzani | 156/264 |
| 4,801,631 A | 1/1989 | Sachs et al. | |
| 5,278,211 A | 1/1994 | Chandran | |
| 2007/0102108 A1* | 5/2007 | Zheng et al. | 156/272.2 |
| 2007/0167561 A1 | 7/2007 | Pisanova et al. | |

FOREIGN PATENT DOCUMENTS

| | | |
|---|---|---|
| CN | 101 045 307 | 10/2007 |
| DE | 102 24 530 | 12/2003 |
| EP | 0 234 459 | 9/1987 |
| JP | 2003 082320 | 3/2003 |
| WO | 2007084307 | 7/2007 |

OTHER PUBLICATIONS

International Search Report, mailed Nov. 3, 2009 in co-pending related International application No. PCT/IB2009/006256, 3 pages.
Written Opinion, mailed Jan. 21, 2010, in co-pending related International application No. PCT/IB2009/006256, 9 pages.

* cited by examiner

*Primary Examiner* — Michael Orlando
(74) *Attorney, Agent, or Firm* — Meunier Carlin & Curfman, LLC

(57) ABSTRACT

Multilaminar wood block from which to obtain multilaminar wood veneers by means of a slicing operation comprising a plurality of superimposed wood veneers (2), and a plurality of layers (3) of adhesive alternating with the veneers (2) to stably connect a veneer (2) with an adjacent veneer (2). The layer (3) of adhesive is formed from a glue free from formaldehyde.

15 Claims, 1 Drawing Sheet

MULTILAMINAR WOOD VENEER BLOCK, MULTILAMINAR WOOD VENEERS AND METHOD FOR THE MANUFACTURE THEREOF

This disclosure generally relates to blocks in multilaminar wood and veneers obtained from it by slicing, and a method for the manufacture thereof. This disclosure, in particular, refers to the sector of woodworking, and in more detail in the manufacture of wood veneers made starting from blocks (or boards, also hereinafter designated "blocks" or "block") made up of a plurality of thin sheets (veneers) of wood glued together to form a single multilaminar body.

BACKGROUND

It is known that the manufacture of blocks and of the relative veneers in multilaminar wood is performed by feeding in sequence a plurality of thin sheets of wood and stacking them, interposing between one sheet and another a layer of adhesive, until a single body having a desired thickness is formed. Subsequently, the aforementioned body made up of sheets alternating with layers of glue is compacted by a pressing action which causes the body to assume a thickness equal to the final thickness.

The adhesive usually employed for the manufacture of boards in multilaminar wood is a bonding mixture based on urea-formaldehyde resins. This type of additive has hitherto shown itself to be the only one capable of satisfying the requirements imposed by the production of multilaminar wood boards, and in particular:
chemical and physical stability in the storage phase;
reactivity and viscosity suitable for the technology used for application to wood veneers;
possibility of being coloured at the time of application;
ease of washing at the end of processing;
degree of elasticity such as to allow the multilaminar wood block to be subsequently sliced;
bonding power such as to allow good workability of the block thus obtained;
relatively low toxicity.

With reference to the toxicity, it is due principally to the formaldehyde included in the bonding mixture, which is considered capable of causing damage to human health. Current legislation therefore specifies ever smaller quantities of formaldehyde, and frequently this entails studies carried out by companies in the sector to reduce the quantities of this compound while however maintaining unaltered all the other properties of the adhesive.

In this connection, starting from glues based on urea-formaldehyde resin, the composition is altered by means of suitable additives (formaldehyde sequestrants, melamine resins, hardeners etc.) so as to have available a bonding mixture capable of satisfying the specified requirement of low toxicity. In the light of the above, the currently known bonding mixtures inevitably have an unavoidable minimum of formaldehyde, and this to a growing extent increases the problems relating to the use of these bonding mixtures for the manufacture of multilaminar wood blocks.

Other types of adhesives or bonding mixtures are currently known which are free from formaldehyde; however, they are not suitable for use in the manufacture of multilaminar wood blocks because they have unsuitable properties for satisfying the above requirements. In particular, one of the principal disadvantages is due to the excessive rapidity of setting of these bonding mixtures, which cure before the multilaminar wood block is completed, making it impossible to correctly carry out the compaction phase of the superimposed sheets.

It should in fact be noted that the production of a multilaminar wood block requires the coupling together of 300-1500 veneers which must be spread with adhesive, joined together and then pressed before the adhesive cures.

It is also necessary to ensure the satisfaction of all the other requirements of the finished product, referred to above, which depend heavily on the adhesive used, which will in fact be found interposed between the 300-1500 thin sheets (veneers) of wood.

In general, then, adhesives which are not urea-formaldehyde based are not able to ensure, once curing is complete, the correct elasticity to allow the multilaminar wood to be sliced.

In this situation, in certain instances, the technical task is to propose a multilaminar wood block, and a method for the manufacture thereof, capable of obviating the disadvantage mentioned above.

Within the scope of this technical task it is an object to make available a multilaminar wood block, and a method for the manufacture thereof, which achieve a very low level if not indeed a complete lack of toxicity.

In certain instances, it is a further object to make available a multilaminar wood block, and a method for the manufacture thereof, which use a bonding mixture capable of satisfying the requirements listed above, and in particular which have a curing time sufficient to allow the stacking of a predetermined number of sheets.

In certain instances, it is also an objective to make available a multilaminar wood block which can be correctly sliced without being ruined or ruining the cutting tools.

These objects, and yet others, are substantially achieved by a multilaminar wood block and a method for the manufacture thereof, having respectively the technical characteristics set forth in the independent claims and/or in one or more of the claims dependent upon them.

The description is now set forth, by way of example but without exclusive effect, of an embodiment of a multilaminar wood block, and a method for the manufacture thereof, in accordance with the attached drawings.

DETAILED DESCRIPTION

Figure 2:
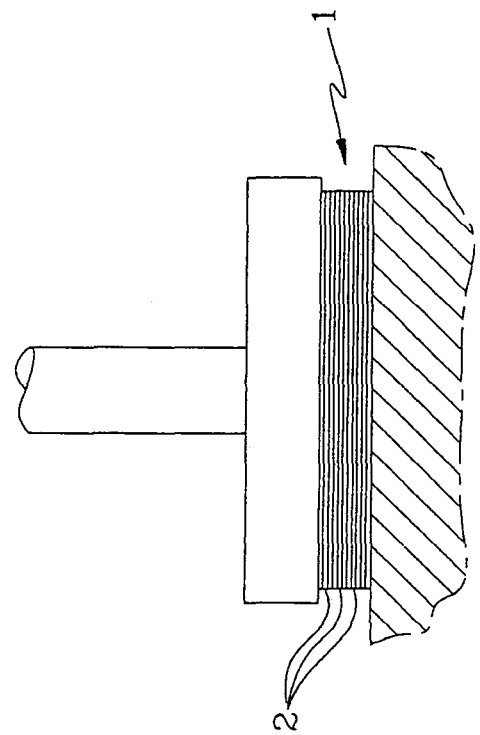
FIG. 2 shows the block shown in FIG. 1 in a second stage of manufacture.
Figure 1:
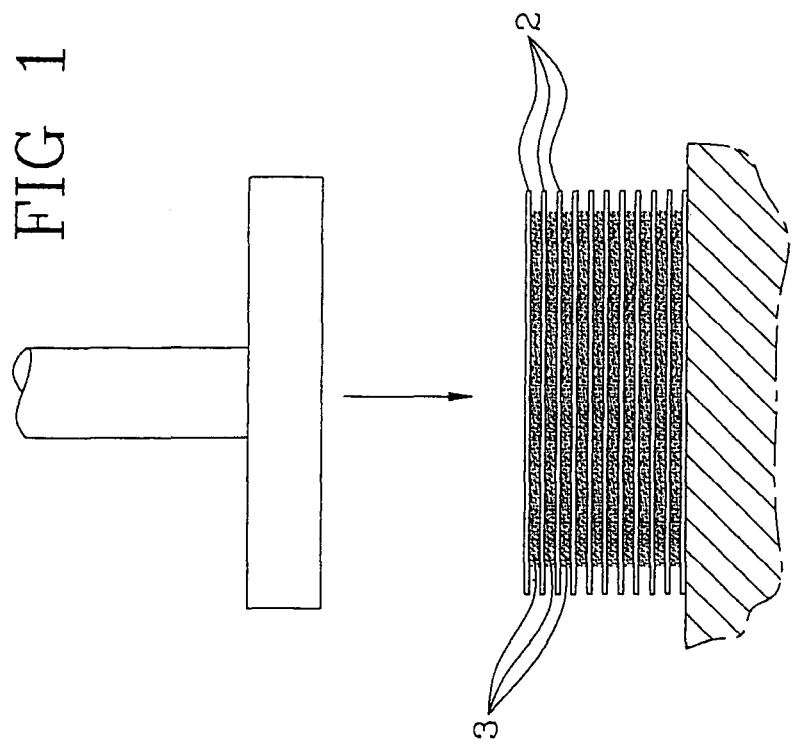
FIG. 1 shows a frontal view of a block in a first stage of manufacture and in accordance with the concepts described herein.

With reference to the attached figures, no. 1 comprehensively indicates a block in accordance with the concepts described herein. The block 1 comprises a plurality of sheets 2 of wood, or veneers, each having a thickness certainly less than 5 millimeters and optionally between 0.1 and 2 millimeters. Reference will be made below to wood veneers which have dimensional characteristics, of thickness in particular, which are governed by regulations and are lower than clearly predefined values.

In fact, in order to be described as solid timber, according to UNI European standards, the wood must have a minimum thickness of 5 mm; if the thickness is below this, we speak of wood veneer (slices of wood).

The veneers 2 are made integral with each other by means of layers 3 of adhesive alternating with the sheets 2 themselves.

Advantageously, the adhesive may be obtained from an aqueous dispersion based on polyurethane free from formaldehyde, with the addition of a catalyst comprising liquid isocyanate, free from solvents. This aqueous dispersion may be mixed with the catalyst and then applied to the individual veneers 2 to form the block 1.

In general, but not necessarily, the mixture is deposited by painting or by roller or by spraying on one or both faces of each veneer 2 which is immediately superimposed on the veneer which has previously been treated with the adhesive.

Optionally, the aforementioned aqueous dispersion has a viscosity of between 400 and 2000 mPa·s. In particular, furthermore, the aforementioned dispersion has a pH of between 5 and 12.

In accordance with a manufacturing procedure, a sequence of wood veneers 2 is fed towards a processing station where on one face of each sheet 2 a layer 3 of the aforementioned adhesive is applied.

On each sheet 2 a quantity of adhesive is deposited of between, for example, 50 and 400 $g/m^2$ and particularly of between 100 and 230 $g/m^2$. The veneers 2 are then superimposed in sequence to form a single stack consisting of an alternate succession of sheets 2 and layers 3 of adhesive.

The stack thus created is subjected to compressive action by means of a press, for example a flat press, which compresses the sheets 2 one against another, bringing about a crushing of the stack and causing it to assume a thickness substantially corresponding to the thickness of the block 1 to be manufactured. The aforementioned compression stage may be maintained for a time of between 2 and 20 hours, particularly between 4 and 12 hours, at a temperature of between 5 and 70° C., particularly between 15 and 45° C., in such a way as to allow optimal curing of the adhesive (this stage can also be carried out at room temperature).

In accordance with a variant embodiment of this manufacturing procedure, the block 1 is obtained by superimposition and gluing of 2 distinct stacks of veneers 2 (i.e. of two multilaminar wood blocks subsequently coupled together), each obtained with a plurality of veneers 2 in accordance with the procedure described above. Each of said stacks has a predetermined thickness, substantially equal for example to half the final thickness of the block 1 to be obtained. In this way the time necessary for the completion of each stack is halved, and the compression of each stack can be carried out immediately after its completion, thus reducing the risks of a premature curing of the adhesive which otherwise would make that stack of sheets 2 unusable. Subsequently the two stacks are superimposed and a layer of adhesive, of the type described above, is interposed between them, and the stacks thus superimposed are subjected to a compression stage in order to glue the stacks together and thus obtain a block 1 with a thickness equal to the desired value.

In accordance with further embodiments of this procedure, the manufacture of the block 1 may be performed starting from three or more stacks, each of them comprising a plurality of sheets 2. The stacks are subsequently superimposed to obtain the block 1 in accordance with the description given above.

It should be noted in general that each multilaminar wood block comprises in general more than 200 superimposed veneers, and in particular their number, very high but able to vary widely, is between 400 and 1500 sheets of wood veneer.

It should be noted that alternatively it would be possible to use a glue with a vinyl base, this too being preferably free from formaldehyde.

The adhesive used for the production of the boards in accordance with the concepts described herein is in fact free from formaldehyde and therefore has a very low if not non-existent toxicity, complying currently with all the regulations, including the most restrictive.

Furthermore, the adhesive satisfies the requirements previously listed. In particular, the viscosity of this adhesive has shown itself to be optimal in the field of the production of multilaminar blocks, and furthermore the working life of this adhesive proves to be 8-10 hours, sufficient therefore to allow it to be stored during processing without losing its adhesive properties.

In addition, the use of an adhesive in the form of an aqueous dispersion reduces the risks of premature curing of the adhesive, thus allowing the superimposition of all the sheets necessary for the manufacture of the board, and allowing a subsequent correct action of compacting the sheets.

The finished block also has the necessary elasticity to allow the slicing operations.

Potentially, too, the adhesive can be coloured to ensure the possibility of varying the aesthetics of the finished product in a customized manner.

The invention claimed is:

1. A method for the production of multilaminar wood veneer blocks, comprising:
   preparing a first plurality of wood veneers having a thickness less than 5 mm each, said wood veneers being at least in the number of 200;
   applying a layer of adhesive to each of said at least 200 veneers, said stage of applying a layer of adhesive being performed by applying an adhesive selected from the group consisting of polyurethane-based adhesives free from formaldehyde and vinyl-based adhesives free from formaldehyde;
   superimposing said at least 200 veneers until a predetermined thickness is reached and in such a way that the adhesive remains interposed between successive veneers; and
   subjecting said at least 200 veneers to a compression stage aimed at compacting said superimposition of adhesive and veneers one against the other in order to achieve the gluing of said at least 200 veneers, wherein the working life of the adhesive is at least 8 hours and the compression stage is maintained for at least 2 hours.

2. The method according to claim 1, wherein said step of applying a layer of adhesive comprises applying a polyurethane-based aqueous dispersion free from formaldehyde and having a viscosity of between 400 and 2000 mPa·s.

3. The method according to claim 2, wherein said polyurethane-based aqueous dispersion free from formaldehyde has a pH of between 5 and 12.

4. The method according to claim 1, wherein said stage of subjecting said at least 200 veneers to a compression stage is maintained for a duration of between 4 and 20 hours.

5. The method according to claim 1, wherein said stage of subjecting said veneers to a compression stage is performed at a temperature of between 5 and 70° C.

6. The method according to claim 1, wherein said stage of subjecting said veneers to a compression stage is performed at a temperature of between 15 and 45° C.

7. The method according to claim 1, wherein said stage of applying the layer of adhesive comprises the stage of mixing said adhesive with a catalyst, said catalyst being a liquid isocyanate free from solvents.

8. The method according to claim 1, wherein said stage of applying a layer of adhesive to said veneers is performed by depositing on each of said veneers a quantity of adhesive of between 50 and 400 $g/m^2$.

9. The method according to claim 1, wherein said stage of applying a layer of adhesive to said veneers is performed by depositing on each of said veneers a quantity of adhesive of between 100 and 230 g/m$^2$.

10. The method according to claim 1, wherein said stage of preparing said veneers is performed by preparing wood veneers each having a thickness of between 0.1 and 2 millimeters.

11. The method according to claim 1, further comprising:
preparing a second plurality of wood veneers;
applying a layer of adhesive to each of said veneers of said second plurality of veneers;
superimposing said veneers of said second plurality of veneers until a predetermined thickness is reached and in such a way that the adhesive remains interposed between successive veneers;
subjecting said second plurality of veneers to a compression stage aimed at compacting said veneers one against the other in order to achieve the gluing of said veneers;
superimposing said first plurality of compacted veneers and said second plurality of compacted veneers and interposing a layer of adhesive; and
subjecting said first and second pluralities of veneers to a compression stage aimed at compacting said plurality of veneers one against the other in order to achieve a board having a desired final thickness.

12. The method according to claim 1, further comprising:
preparing a polyurethane-based adhesive free from formaldehyde;
dispersing said polyurethane-based adhesive in water; and
mixing said adhesive dispersed in water with a catalyst in a percentage between 2% and 20% by volume.

13. The method according to claim 12, wherein said mixing stage is carried out homogeneously by means of a mechanical agitator.

14. The method according to claim 12, wherein the step of mixing said adhesive with a catalyst is a step of mixing said catalyst in a percentage between 4% and 6% by volume.

15. A method for obtaining a multilaminar wood veneer, comprising:
a) producing a multilaminar wood block according to the following steps:
preparing a first plurality of wood veneers having a thickness less than 5 mm each, said wood veneers being at least in the number of 200;
applying a layer of adhesive to each of said at least 200 veneers, said stage of applying a layer of adhesive being performed by applying an adhesive selected from the group consisting of polyurethane-based adhesives free from formaldehyde and vinyl-based adhesives free from formaldehyde;
superimposing said at least 200 veneers until a predetermined thickness is reached and in such a way that the adhesive remains interposed between successive veneers;
subjecting said at least 200 veneers to a compression stage aimed at compacting said superimposition of adhesive and veneers one against the other in order to achieve the gluing of said at least 200 veneers, wherein the working life of the adhesive is at least 8 hours and the compression stage is maintained for at least 2 hours; and
b) slicing the multilaminar wood block to obtain a multilaminar wood veneer.

* * * * *